April 28, 1970     D. M. GATTO ET AL     3,508,883
AUTOMATIC PRESSURE ADJUSTOR
Filed Oct. 30, 1967
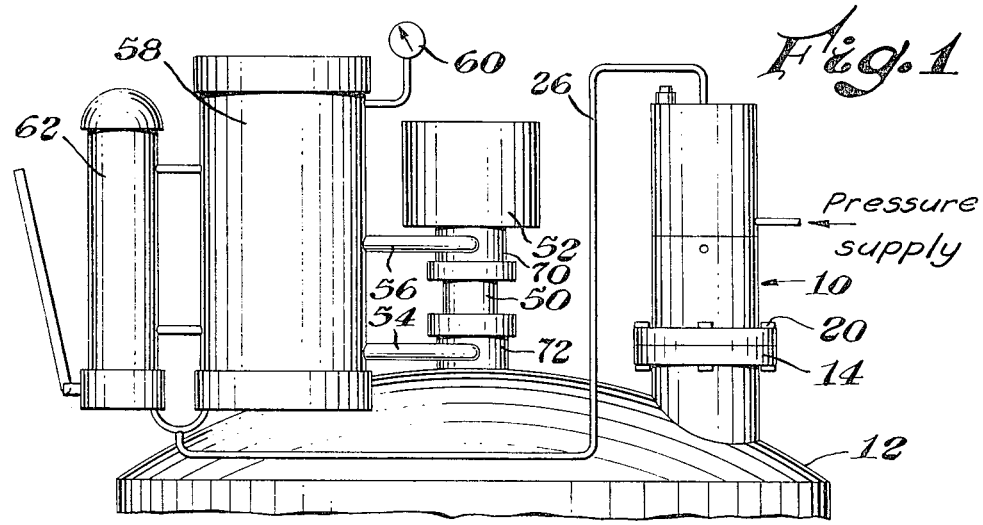
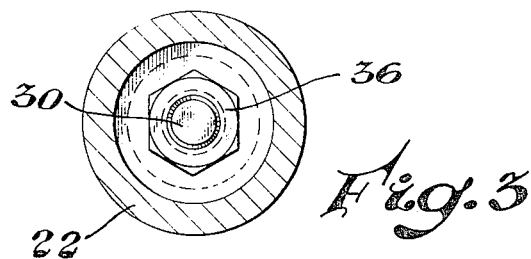
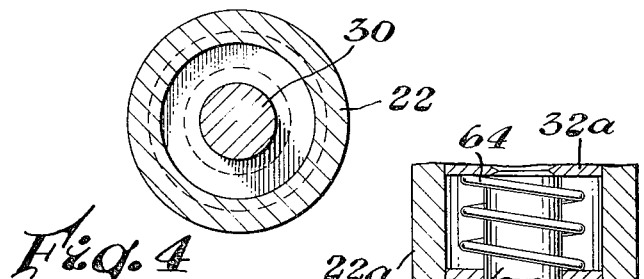
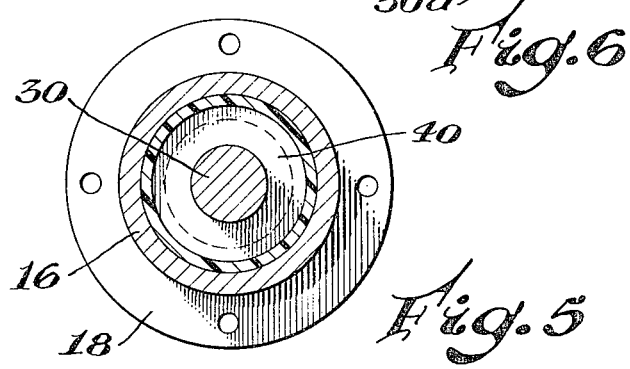
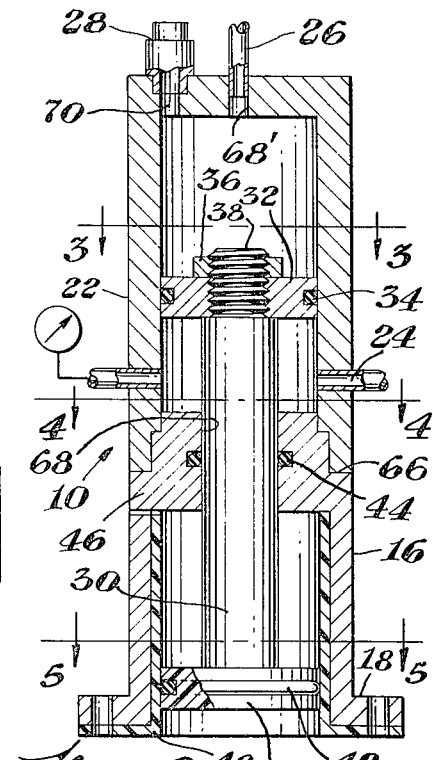
INVENTORS.
David M. Gatto
Kenneth E. Cox
BY Earl Q. Ayers
AGENT United States Patent Office 3,508,883
Patented Apr. 28, 1970

3,508,883
AUTOMATIC PRESSURE ADJUSTOR
David M. Gatto, Antioch, Calif., and Kenneth E. Cox, Albuquerque, N. Mex., assignors to The Dow Chemical Company, Midland, Mich., a corporation of Delaware
Filed Oct. 30, 1967, Ser. No. 678,918
Int. Cl. B01j 3/00; F16n 11/10, 11/64
U.S. Cl. 23—290
6 Claims

ABSTRACT OF THE DISCLOSURE

Means to automatically vary the pressure on the lubricant in the rotary seal of a stirred reactor vessel so that the seal pressure always exceeds the pressure in the reactor vessel by a preselected amount, comprising a mechanical analogue of a pressure adder in which two piston disks are mounted on a common shaft. The reactor pressure is applied to one disk. A predetermined bias (spring or fluid pressure) is exerted on one face of the second disk so that the sum of the reactor and bias pressures is transmitted by the other face of the second disk to the lubricant which is fed to the seal.

Background of the invention

This invention relates to apparatus for automatically adjusting the pressure on the lubricant in a seal in a pressurized vessel through which a rotatable shaft extends so that the pressure exerted by the lubricant in the seal exceeds the reactor pressure by a predetermined amount, and particularly to such apparatus as adapted for use with rotary seals of stirred reactor vessels.

It is well known in the art to have stirring means extend through covers or walls of pressurized reactor vessels, and means, usually a manually operated pump, have been provided to pressurize the lubricant at the seals through which the shaft of the stirring means extends to prevent the reacting materials in the vessel from entering the seal.

Such a lubrication system requires constant supervision, is step-wise in operation, and is subject to operator error.

Accordingly, a principal object of this invention is to provide improved apparatus for varying the pressure on the lubricant in a rotary seal of a reactor vessel so the lubricant pressure always exceeds the pressure in the reactor by a predetermined amount.

In accordance with this invention there is provided apparatus including a pressure adder device having two discs on a common shaft. The reactor pressure is applied to the disc which communicates with the interior of the vessel and a bias pressure is applied in additive relationship against the second disc. The output pressure, developed above the second disc, is coupled to the lubrican reservoir which in turn is coupled to the shaft seals.

Thus, if reactor vessel pressure drops, the pressure on the lubricant is dropped (to a minimum of the bias pressure). If the pressure in the reactor vessel rises, the output of the device raises the pressure on the lubricant which is applied to the shaft seals.

The invention, as well as additional objects and advantages thereof will best be understood when the following detailed description is read in connection with the accompanying drawing, in which:

FIG. 1 is a fragmentary elevational view of apparatus in accordance with this invention;

FIG. 2 is an elevational view, partly in section, of a pressure adjustor device in accordance with this invention;

FIG. 3 is a sectional view taken along the line 3—3 of FIG. 2;

FIG. 4 is a sectional view taken along the line 4—4 of FIG. 2;

FIG. 5 is a sectional view taken along the line 5—5 of FIG. 2, and

FIG. 6 is a fragmentary sectional view of the device shown in FIG. 2.

Referring to the drawing, there is shown a reactor vessel 12 having a rotating shaft 50 driven by a motor 52. A closed lubricant reservoir 58 having a pressure gauge 60 coupled thereto is coupled by means of conduits 54, 56 to shaft seals 72, 70, respectively.

A hand operated pump 62, mechanically attached to the reservoir 58, has an output conduit coupled to the reservoir 58 and also is coupled to the pressure adjustor device 10 through the conduit 26.

Referring especially to FIGS. 2 through 5, the pressure adjustor device 10 comprises a lower cylindrical part 16 having a closed end 46 and an outwardly extending flange 18 at its open end.

An axially disposed bore 68 extends through the closed end 46. The wall of the bore 66 has a circumferentially extending groove therein which contains an O ring seal element 44. A shaft 30 extends through the bore 68 and has a disc 40 secured to its lower end which fits closely but slidably within the inner cylindrical walls of the part 16. The disc contains an O ring type seal element in a circumferential groove. The inner wall of the part 16 and the disc, as well as the bottom of the flange 18 are coated with a material 48 which is impervious to the atmosphere present in the reactor vessel 12.

A top part 22 which is cylindrical in shape, has a closed end and an open end, has its open end coupled to the closed end 46 of the part 16, as at 66, for example. The conduit 26 is coupled to the interior of the part 22 through the bore 68'. A plug 28 closes the bore 70.

A disc 32 containing a circumferentially disposed O ring type seal 34 is secured by means of the nut 36 to the threaded upper end 38 of the shaft 30.

The disc 32, like the disc 40, fits closely but slidably within the section 22.

A source of fluid under predetermined pressure, not shown, is coupled to the interior of the section 22 through the tube 24.

The device 10 is coupled to the reactor vessel 12 by bolts 20 engaging the flange 14.

In operation, with sufficient air pumped into the system by means of the hand pump 62 to move the disc 32 to a position about midway between the ends of section 22, and with the pressure applied through the tube 24 at a pressure of, for example, twenty-five pounds, the lubricant is applied to the seals 70, 72. The pressure on the disc 32 exceeds the normal pressure in the reactor vessel 12 by a predetermined amount.

The lower disc 40, coupled to the same shaft 30 as is the disc 32, is exposed to the interior of the reactor vessel 12. If the pressure in the reactor vessel 12 rises, the shaft 30 advances upwardly, further compressing fluid above the disc and transmitting the increased pressure through the line 26 to the reservoir 58, thus increasing the pressure on the seal lubricant.

Conversely, if the pressure in the reactor decreases, the shaft will move downwardly to maintain a balance in the pressure relationship between the seal lubricant and the reactor vessel. Thus, this invention automatically maintains the reactor lubricant at a predetermined pressure above the pressure in the reactor vessel, assuring that the reactor vessel contents will not enter the seals.

FIG. 6 illustrates a replacement of fluid bias pressure application by spring biasing means. In the section 22a, a compressed helical spring 64 surrounds the shaft 30a and bears against the disc 32a as well as the top of the lower section of the device.

Special materials of construction may be required if corrosive vapors or liquids are being reacted in the vessel 12.

The lining material 48 may be Teflon, for example. The O type ring seals are made of rubber.

Other materials may be used, of course, the choice of materials depending on the anticipated conditions of operation of the device.

When the bias pressure is applied to disc 32 as a fluid pressure, the disc can be coupled at other than a 90° angle to shaft 30 with modification of the disc and O-ring seal 34 to an elliptical shape and with suitable modification of the means, such as nut 36 and threaded shaft length 38, employed to secure the disc on the shaft.

What is claimed is:

1. Pressure adjustor apparatus for maintaining a predetermined differential between the pressure on a lubricant in a seal and the pressure in a reactor vessel, comprising a hollow reactor vessel having a rotatable shaft extending therefrom, said shaft having at least one seal coupled thereto; a pressurized lubricant reservoir; a pressure adjustor device comprising a first cylindrical chamber and a second cylindrical chamber disposed in axial end-to-end relationship with respect to each other, said chambers being separated from one another by at least one wall, said first chamber having an end part which communicates with the interior of said vessel, an elongated shaft, said shaft being axially aligned with said chambers and extending through said at least one wall into each chamber, said shaft having a pair of discs coupled transversely thereto, one disc being coupled adjacent to each end of said shaft with the discs in close fitting but slidable relationship with the walls of the respective chambers, means for maintaining a biasing pressure between the end part of said second chamber adjacent to said first chamber and said disc in said second chamber, tubular means communicating between the end part of said second chamber remote from a shaft and a pressurized lubricant reservoir; and tubular means connecting said reservoir to said seal.

2. Apparatus in accordance with claim 1, wherein said means for maintaining a bias pressure is a pressurized fluid.

3. Apparatus in accordance with claim 1, wherein said means for maintaining a bias pressure is a spring disposed around said shaft and bearing against said disc in said second chamber.

4. Apparatus in accordance with claim 1, wherein said chambers have a common wall.

5. Apparatus in accordance with claim 1, wherein the side walls and the disc in said first chamber have their surfaces coated with a material which is nonreactive chemically with respect to material in said vessel.

6. Apparatus in accordance with claim 1 in which each of said pair of discs is coupled perpendicularly to said shaft.

References Cited

UNITED STATES PATENTS 2,991,161    7/1961    Gasche _____ 23—252 XR

FOREIGN PATENTS 1,111,601    7/1961    Germany.

MORRIS O. WOLK, Primary Examiner

D. G. MILLMAN, Assistant Examiner

U.S. Cl. X.R.

23—252; 184—39; 277—59